(12) United States Patent
DeCusatis et al.

(10) Patent No.: US 9,104,643 B2
(45) Date of Patent: Aug. 11, 2015

(54) OPENFLOW CONTROLLER MASTER-SLAVE INITIALIZATION PROTOCOL

(71) Applicant: International Business Machines Corporation, Armonk, NY (US)

(72) Inventors: Casimer DeCusatis, Poughkeepsie, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/833,848

(22) Filed: Mar. 15, 2013

(65) Prior Publication Data

US 2014/0281669 A1    Sep. 18, 2014

(51) Int. Cl.
*G06F 11/00* (2006.01)
*G06F 11/20* (2006.01)

(52) U.S. Cl.
CPC ...... *G06F 11/2005* (2013.01); *G06F 2201/805* (2013.01); *G06F 2201/85* (2013.01)

(58) Field of Classification Search
CPC .................................................. G06F 11/2005
USPC ........................................ 714/4.1, 4.11, 4.21
See application file for complete search history.

(56) References Cited

U.S. PATENT DOCUMENTS

| | | | |
|---|---|---|---|
| 6,208,619 B1 | 3/2001 | Takeuchi | |
| 6,356,944 B1 | 3/2002 | McCarty | |
| 6,504,818 B1 | 1/2003 | Levine | |
| 6,504,821 B2 | 1/2003 | Berger | |
| 6,947,380 B1 | 9/2005 | Yip et al. | |
| 7,187,652 B2 | 3/2007 | Lee et al. | |
| 7,234,073 B1 * | 6/2007 | Roytman et al. | 714/4.11 |
| 7,289,453 B2 | 10/2007 | Riedel et al. | |
| 7,949,893 B1 * | 5/2011 | Knaus et al. | 714/4.1 |
| 8,069,139 B2 * | 11/2011 | Garbow et al. | 707/609 |
| 8,082,466 B2 * | 12/2011 | Tanaka et al. | 714/6.3 |
| 8,724,470 B2 | 5/2014 | Yi et al. | |
| 2002/0073354 A1 * | 6/2002 | Schroiff et al. | 714/4 |

(Continued)

FOREIGN PATENT DOCUMENTS

| | | |
|---|---|---|
| CN | 101313278 A | 11/2008 |
| CN | 101398770 A | 4/2009 |

(Continued)

OTHER PUBLICATIONS

Curtis, et al. "DevoFlow: Scaling Flow Management for High-Performance Netowrks". SIGCOMM'11, Aug. 15-19, 2011, Toronto, Ontario, Canada.

(Continued)

*Primary Examiner* — Joshua P Lottich
(74) *Attorney, Agent, or Firm* — Cantor Colburn LLP; Steven Chiu (57) ABSTRACT

A method for network controller initialization that includes identifying a controller connected to a network as a primary controller that manages switches in the network. One or more other controllers connected to the network are identified as secondary controllers. A failover priority table is created. The failover table indicates an order that the one or more other controllers will replace the controller as the primary controller in the event that the controller enters a failure mode. The failover priority table is broadcast to the switches in the network.

4 Claims, 6 Drawing Sheets

(56) References Cited

U.S. PATENT DOCUMENTS

| | | | |
|---|---|---|---|
| 2002/0196749 A1 | 12/2002 | Eyuboglu et al. | |
| 2003/0051187 A1* | 3/2003 | Mashayekhi et al. | 714/4 |
| 2004/0153866 A1* | 8/2004 | Guimbellot et al. | 714/47 |
| 2006/0126509 A1 | 6/2006 | Abi-Nassif et al. | |
| 2006/0215550 A1 | 9/2006 | Malhotra | |
| 2007/0204266 A1 | 8/2007 | Beaty et al. | |
| 2007/0220121 A1 | 9/2007 | Suwarna | |
| 2008/0137669 A1 | 6/2008 | Balandina et al. | |
| 2008/0192752 A1 | 8/2008 | Hyslop et al. | |
| 2009/0089609 A1* | 4/2009 | Baba | 714/4 |
| 2009/0213861 A1 | 8/2009 | Benner et al. | |
| 2009/0232001 A1 | 9/2009 | Gong et al. | |
| 2010/0014487 A1 | 1/2010 | Attar et al. | |
| 2010/0027420 A1 | 2/2010 | Smith | |
| 2010/0138686 A1* | 6/2010 | Arata et al. | 714/4 |
| 2010/0146327 A1* | 6/2010 | Takubo | 714/4 |
| 2010/0166424 A1 | 7/2010 | Nagarajan et al. | |
| 2010/0214970 A1 | 8/2010 | Brunner et al. | |
| 2010/0238805 A1 | 9/2010 | Ludwig et al. | |
| 2010/0302935 A1 | 12/2010 | Zhang et al. | |
| 2011/0026437 A1 | 2/2011 | Roja-Cessa et al. | |
| 2011/0032821 A1 | 2/2011 | Morrill et al. | |
| 2011/0085444 A1 | 4/2011 | Ko et al. | |
| 2011/0090797 A1 | 4/2011 | Beecroft | |
| 2011/0135305 A1 | 6/2011 | Barnard | |
| 2011/0142450 A1 | 6/2011 | Tanzi et al. | |
| 2011/0158647 A1 | 6/2011 | Solheim et al. | |
| 2011/0158658 A1 | 6/2011 | Myslinski et al. | |
| 2011/0211834 A1 | 9/2011 | Ansari et al. | |
| 2011/0242966 A1 | 10/2011 | Van Caenegem | |
| 2011/0261696 A1 | 10/2011 | Crisan et al. | |
| 2011/0261831 A1 | 10/2011 | Sharma et al. | |
| 2011/0271007 A1 | 11/2011 | Wang et al. | |
| 2011/0273988 A1 | 11/2011 | Tourrilhes et al. | |
| 2011/0283016 A1 | 11/2011 | Uchida | |
| 2011/0286324 A1 | 11/2011 | Bellagamba et al. | |
| 2011/0292830 A1 | 12/2011 | Yanggratoke et al. | |
| 2011/0299389 A1 | 12/2011 | Mau et al. | |
| 2011/0305167 A1 | 12/2011 | Koide | |
| 2011/0305288 A1 | 12/2011 | Liu et al. | |
| 2012/0008958 A1 | 1/2012 | Dahlfort et al. | |
| 2012/0014284 A1 | 1/2012 | Ranganathan et al. | |
| 2012/0014693 A1 | 1/2012 | Cheng et al. | |
| 2012/0020361 A1 | 1/2012 | Ueno | |
| 2012/0023231 A1 | 1/2012 | Ueno | |
| 2012/0030306 A1 | 2/2012 | Kami | |
| 2012/0195201 A1 | 8/2012 | Ishikawa | |
| 2012/0207175 A1 | 8/2012 | Raman et al. | |
| 2012/0221887 A1* | 8/2012 | Hansson et al. | 714/4.11 |
| 2012/0250496 A1* | 10/2012 | Kato | 370/216 |
| 2012/0287782 A1 | 11/2012 | Lv et al. | |
| 2013/0010600 A1 | 1/2013 | Jocha et al. | |
| 2013/0054761 A1 | 2/2013 | Kempf et al. | |
| 2013/0250770 A1 | 9/2013 | Zou et al. | |
| 2013/0258843 A1 | 10/2013 | Kurita | |
| 2013/0258847 A1 | 10/2013 | Zhang et al. | |
| 2013/0266317 A1 | 10/2013 | Wang | |
| 2013/0268686 A1 | 10/2013 | Wang et al. | |
| 2013/0294236 A1 | 11/2013 | Beheshti-Zavareh et al. | |
| 2014/0016647 A1 | 1/2014 | Yoshida et al. | |
| 2014/0092907 A1 | 4/2014 | Sridhar et al. | |
| 2014/0119193 A1 | 5/2014 | Anand et al. | |
| 2014/0126907 A1 | 5/2014 | Hirth et al. | |
| 2014/0178066 A1 | 6/2014 | Patel et al. | |
| 2014/0258774 A1* | 9/2014 | Taylor et al. | 714/4.11 |

FOREIGN PATENT DOCUMENTS

| | | |
|---|---|---|
| CN | 101677321 A | 3/2010 |
| CN | 101997644 A | 3/2011 |
| CN | 102291389 A | 12/2011 |
| EP | 0876023 | 11/1998 |
| GB | 2313268 A | 5/1996 |
| JP | 2011166700 A | 8/2011 |
| WO | 9930462 | 6/1999 |
| WO | 2009113106 A2 | 9/2009 |
| WO | 2011037104 A1 | 3/2011 |
| WO | 2011037148 A1 | 3/2011 |
| WO | 2011065268 A1 | 3/2011 |
| WO | 2011118575 A1 | 9/2011 |
| WO | 2012056816 A | 5/2012 |

OTHER PUBLICATIONS

Egilmez, et al. "Scalable video streaming over OpenFlow networks: An optimization framework for QoS Routing". 2011 18th IEEE International Confernece on Image Processing (ICIP), 2241-2244.

El-Azzab, et al. "Slices isolator for a virtualized openflow node", (2011) First International Symposium on Network Cloud Computing and Applications (NCCA), 121-126.

Li, Z., et al. Compatib le TDM/WDM PON using a Single Tunable Optical Filter for both Downstream Wavelength Selection and Upstream Wavelength Generation. IEEE Photonics Technology Letters, vol. 24, No. 10, May 15, 2012. pp. 797-799.

Liu, et al. "Open Flow-based Wavelength Path Control in Transparent Optical networks: a Proof-of-Concept Demonstration" Sep. 2011, 37th European conference and Exhibition on Optical communication (ECOC).

Anonymous; "Intelligent VM Migration Based on Relative VM Priority and Relative Suitability of Migration Target"; http://priorartdatabase.com/IPCOM/000201632; Nov. 16, 2010, 3 pages.

Anonymous; "Management framework for efficient live migration of virtual machines running migration-aware applications";http://priorartdatabase.com/IPCOM000200260; Oct. 3, 2010, 5 pages.

Wang et al., "Dynamic Bandwidth Allocation for Preventing Congestion in Data Center Networks," ISNN 2011, Part III, LNCS 6677, pp. 160-167, 2011.

Yong, S. et al, "XOR Retransmission in Multicast Error Recovery". Networks, 2000 (ICON2000). Proceedings. IEEE International Conference. pp. 336-340.

Notification of Transmittal of the International Search Report and the Written Opinion of the International Searching Authority, or the Declaration; PCT/IB2014/059457; Mailed Jul. 1, 2014, 6 pages.

UK International Serach Report and Written Opionion for International Application No. PCT/IB2014/059459; International Filing Date: Mar. 5, 2014; Date of Mailing: Jun. 30, 2014; 10 pages.

Johnson, RD.et al.; "Detection of a Working Master Controller by a Slave Card"; http://www.ip.com/pubview/IPCOM000099594D; Feb. 1, 1990, 3 pages.

Pfaff, B.et al.; "Open Flow Switch Specification"; www.openflow.org/document/openflow_spec_v1.0.0.pdf; Feb. 28, 2011, 56 pages.

IBM; "The automatic determination of master-slave relationship between embedded controllers by mearns of a shared hardware access switch"; http://www.ip.com/pubview/IPCOM000020741D; Dec. 11, 2003, 5 pages.

IBM "Software Defined Networking, A new paradigm for virtual dynamic, flexible networking," IBM Systems and Technology, Oct. 2012, 6 pages.

McKeown et al., "OpenFlow: Enabling Innovation in Campus Networks," Mar. 14, 2008, 6 pages.

Notification of Transmittal of the International Search Report and the Written Opinion of the International Searching Authority, or the Declaration; PCT/IB2014/059460; Mailed Jun. 30, 2014, 9 pages.

U.S. Appl. No. 13/833,886; Non-Final Office Action; Date Filed: Mar. 15, 2013; Date Mailed: Dec. 17, 2014; 32 pages.

U.S. Appl. No. 13/833,796; Non-final Office Action; Date Filed Mar. 15, 2013; Date Mailed: Dec. 19, 2014; 31pages.

U.S. Appl. No. 13/833,952; Non-Final Office Action; Date Filed: Mar. 15, 2013; Date Mailed: Nov. 3, 2014; 39 pages.

U.S. Appl. No. 13/834,020; Notice of Allowance, Date Filed: Mar. 15, 2013; Date Mailed; Nov. 20, 2014; 26 pages.

U.S. Appl. No. 13/834,117; Non-Final Office Action; Date Filed: Mar. 15, 2013; Date Mailed: Feb. 26, 2015, 61 pages.

U.S. Appl. No. 13/834,502; Non-Final Office Action; Date Filed: Mar. 15, 2013; Date Mailed: Dec. 4, 2014; 37 pages.

U.S. Appl. No. 14/501,663; Non-Final Office Action; Date Filed: Sep. 30, 2014; Date Mailed: Dec. 19, 2014; 11 pages.

(56) References Cited

OTHER PUBLICATIONS

U.S. Appl. No. 14/501,945; Non-Final Office Action, Date Filed: Sep. 30, 2014; Date Mailed: Jan. 5, 2015; 29 pages.

U.S. Appl. No. 14/502,043; Non-Final Office Action; Date Filed: Sep. 30, 2014; Date Mailed: Dec. 23, 2014; 17 pages.

U.S. Appl. No. 14/501,457, Non-Final Office Action; Date Filed Sep. 30, 2014; Date Mailed: Mar. 18, 2015; 29 pages.

* cited by examiner

OPENFLOW CONTROLLER MASTER-SLAVE INITIALIZATION PROTOCOL

BACKGROUND

The present invention relates to computer networks and, more specifically, to a network controller initialization.

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote direct memory access Protocol (iWARP), Remote direct memory access over Converged Ethernet (RoCE).

In an OpenFlow network environment, network switches are connected via secure links to a network controller which controls switch configuration and routing. Such a network controller typically provides such control via control data packets sent over the secure link, which maintain higher levels of data integrity than conventional Ethernet fabrics.

SUMMARY

Embodiments include a system for network controller initialization. The system is configured to perform a method that includes identifying a controller connected to a network as a primary controller that manages switches in the network. One or more other controllers connected to the network are identified as secondary controllers. A failover priority table is created. The failover table indicates an order that the one or more other controllers will replace the controller as the primary controller in the event that the controller enters a failure mode. The failover priority table is broadcast to the switches in the network.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to a network controller initialization protocol that may be utilized in a network that has multiple network controllers. In an embodiment, one of the network controllers is designated as the primary (or master) network controller and the other network controllers are designated as secondary (or slave) network controllers. In an embodiment, the primary network controller is the only active controller in the network, performing control functions such as, but not limited to, switch configuration control and packet routing. If the primary network controller fails, then one of the secondary network controllers assumes control of the network. This replacement may proceed in an established order to tertiary or other network controllers.

Embodiments of the network controller initialization protocol described herein support the attachment of multiple network controllers to a single network fabric, with at any point in time only one of the network controllers performing control functions. In addition, the protocol may include support for network controller auto-discovery and initialization, confirmed null responses, creation and distribution of failover priority tables, options for revertive and non-revertive failover, and timeout on failed acknowledgements. In an embodiment of a revertive failover, when the failing primary network controller is repaired and returned to the network it is reinstated as the primary network controller.

Embodiments of the protocol described herein provide support for more than one OpenFlow controller being interconnected through an OpenFlow enabled network (also referred to as an OpenFlow network) at the same time. This may eliminate a single point of failure at the OpenFlow controller, at the link between the network controller and a network switch, and/or at the network switch attached to the primary controller in the network. As used herein, the term "primary controller" refers to a network controller (e.g., an OpenFlow controller) that is actively performing control functions, such as directing the network switches, in the network (e.g., an OpenFlow network). As used herein, the term "secondary controller" refers to a network controller in the network that is not actively directing the network switches in the network but that assumes control if the primary controller fails.

Embodiments of the network controller initialization protocol are used to learn the location of all network controllers in the network and to auto-discover an add, a drop and/or a change of network controller status. If a controller is added to an existing network, it will handshake with the first switch that it is connected to; if there is already a primary controller and/or a list of defined secondary controllers in place at the switch, then the new controller is added to the bottom of the secondary controller list by default. If a controller drops out of an existing network, then all switches connected to that controller recognize that they are no longer receiving a keep-alive signal from the controller; in this case, they will declare a new primary controller from the top of their secondary controller list. The network controller initialization protocol described herein may be enabled through a low level protocol which does not require involvement of the intermediate system to intermediate system (IS-IS) routing protocol, or the border gateway protocol (BGP), or other protocols/functions typically associated with switching to a new primary network controller.

Figure 1:
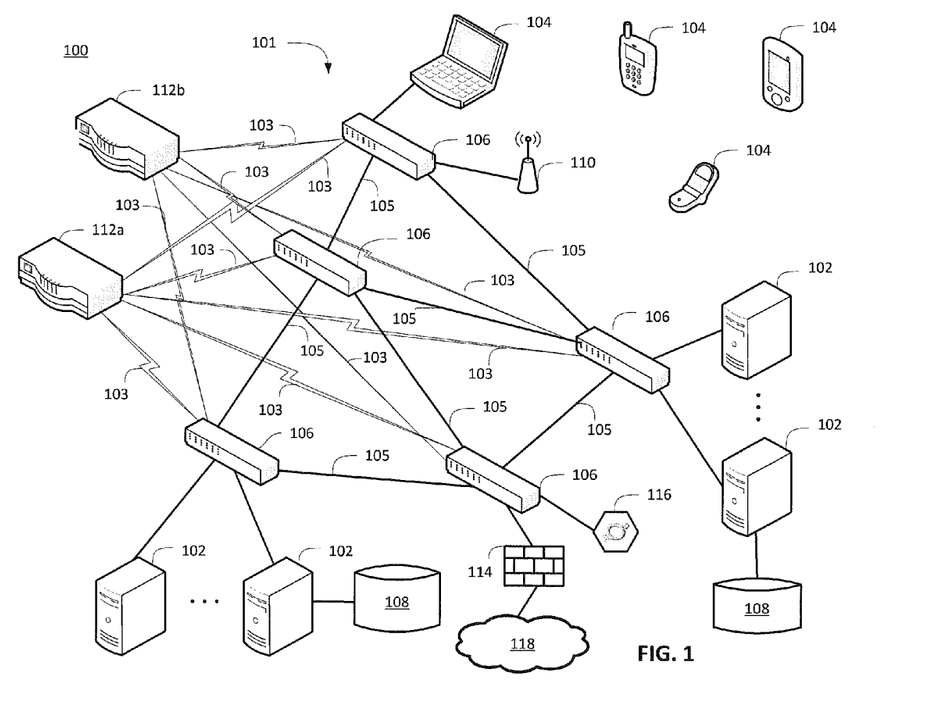
FIG. 1 depicts a block diagram of a system including a network with OpenFlow-capable network switches and multiple network controllers that may be implemented according to an embodiment.

Turning now to FIG. 1, an example of a system 100 including a network 101 that supports OpenFlow will now be described in greater detail. In the example depicted in FIG. 1, the system 100 is a data center environment including a plurality of servers 102 and client systems 104 configured to communicate over the network 101 using switches 106 that are OpenFlow-capable (also referred to as OpenFlow switches). In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. The servers 102 may be storage system servers configured to access and store large amounts of data to one or more data storage systems 108.

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may include one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by each of the servers 102, which can be distributed in various locations of the system 100.

The system 100 also includes two or more network controllers 112a 112b. In an embodiment, one of the network controllers (e.g., network controller 112a) is a primary network controller and the other network controller(s) (e.g., network controller 112b) is a secondary network controller. In an embodiment, the primary network controller is a central software defined network controller configured to make routing decisions within the network 101. The secondary network controller, is also a central software defined network controller configured to make routing decisions within the network 101 if it is selected to do so, in the event, for example, that the primary network controller experiences a failure. The network controller 112a (i.e., the primary network controller) establishes one or more secure links 103 to configure the switches 106 and establish communication properties of links 105 between the switches 106. For example, the network controller 112a can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102.

The servers 102, client systems 104, and network controllers 112a 112b can include various computer/communication hardware and software technology known in the art, such as one or more processing units or circuits, volatile and non-volatile memory including removable media, power supplies, network interfaces, support circuitry, operating systems, and the like. Although the network controllers 112a 112b are depicted as a separate components, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. Embodiments of the network 101 can include numerous switches 106 (e.g., hundreds) with dozens of ports and links per switch 106. The network 101 may support a variety of known communication standards that allow data to be transmitted between the servers 102, client systems 104, switches 106, network controllers 112a 112b, firewalls(s) 114, and load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports OpenFlow as a layer-2 protocol. The switches 106 can be dedicated OpenFlow switches or OpenFlow-enabled general purpose switches that also support layer-2 and layer-3 Ethernet.

Figure 2:
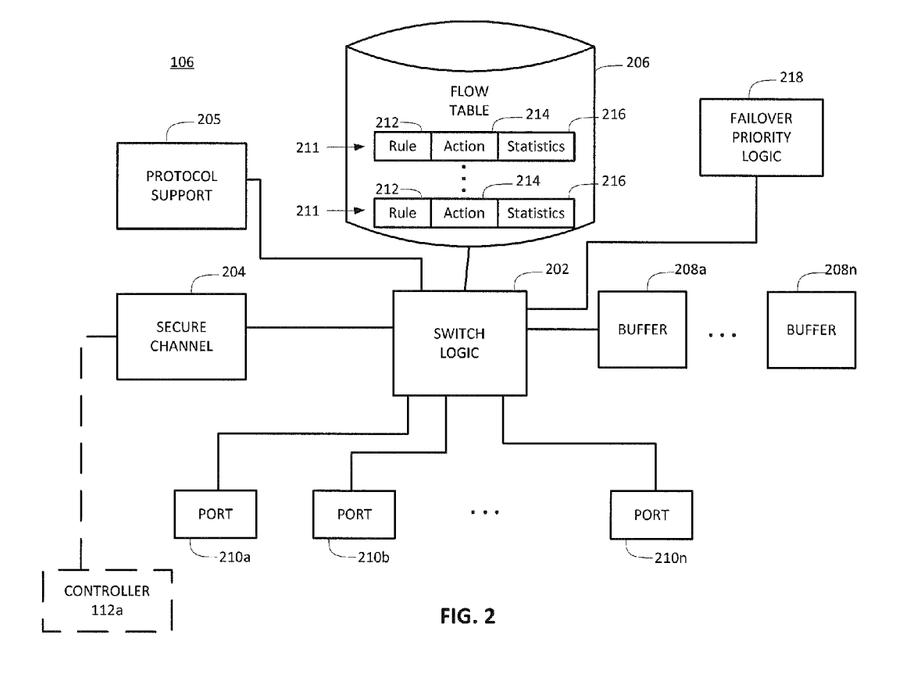
FIG. 2 depicts a block diagram of an OpenFlow-capable network switch according to an embodiment.

FIG. 2 depicts a block diagram of the switch 106 of FIG. 1 that supports OpenFlow. The switch 106 includes switch logic 202, secure channel 204, protocol support 205, flow table 206, buffers 208a-208n, ports 210a-210n, and failover priority logic 218. The switch logic 202 and/or the failover priority logic 218 may be implemented in one or more processing circuits, where a computer readable storage medium is configured to hold instructions for the switch logic 202, as well as various variables and constants to support operation of the switch 106. The switch logic 202 forwards packets between the ports 210a-210n as flows defined by the network controller 112a (i.e., the primary network controller) of FIG. 1. The failover priority logic 218 may be used to build and store a failover priority table that tracks secondary memory controllers (e.g., network controller 112b) that are available in the event that the primary network controller fails. In an embodiment, the failover priority table includes a list of the secondary network controllers in the order that they should be used to replace a failing primary network controller. In an embodiment, each switch 106 has a copy of the failover priority logic 218 and the failover priority table. In an embodiment, the failover priority logic 218 is included in the switch logic 202.

The secure channel 204 connects the switch 106 to the network controller 112a of FIG. 1. The secure channel 204 allows commands and packets to be communicated between the network controller 112a and the switch 106 via the OpenFlow protocol. The secure channel 204 can be implemented in software as executable instructions stored within the switch 106. Protocol details to establish a protocol definition for an implementation of OpenFlow and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide OpenFlow as an enhancement to existing conventional routers or switches.

The flow table 206 defines supported connection types associated with particular addresses, virtual local area networks or switch ports. A flow may be defined as all packets that match a particular header format. Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the network controller 112a of FIG. 1, and dropping packets of the flow. Entries 211 in the flow table 206 can be added and removed by the network controller 112a of FIG. 1 via the secure channel 204. The network controller 112a of FIG. 1 can pre-populate the entries 211 in the flow table 206. Additionally, the switch 106 can request creation of an entry 211 from the network controller 112a upon receiving a flow without a corresponding entry 211 in the flow table 206.

The buffers 208a-208n provide temporary storage in queues for flows as packets are sent between the ports 210a-210n. In a lossless configuration, rather than dropping packets when network congestion is present, the buffers 208a-208n temporarily store packets until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106.

The ports 210a-210n may be physical ports, virtual ports defined by the switch, and/or a virtual port defined by the OpenFlow protocol. When implemented as an OpenFlow switch, the switch 106 also includes a secure channel 204 for communicating with the primary network controller 112a on a secure link.

Figure 3:
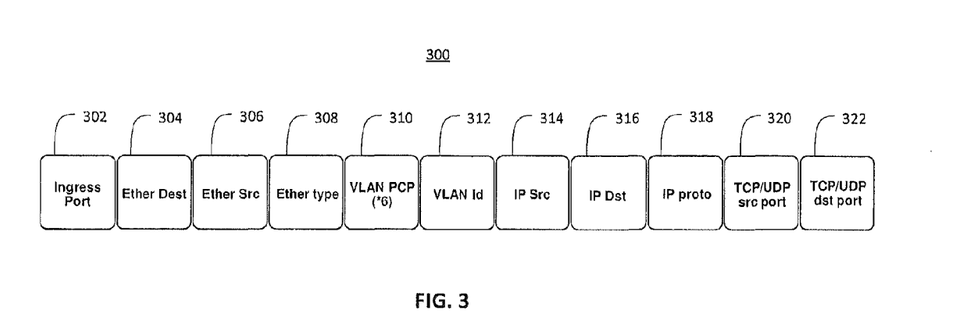
FIG. 3 depicts an example of an OpenFlow flow switching definition that can be used in embodiments.

FIG. 3 depicts an example of an OpenFlow flow switching definition 300 that can be used in embodiments. The OpenFlow flow switching definition 300 is a packet header that defines the flow and includes a number of fields. In this example, the switching definition 300 is a flow header that includes up to eleven tuples or fields; however, not all tuples need to be defined depending upon particular flows. In the example of FIG. 3, the OpenFlow flow switching definition 300 includes tuples for identifying an ingress port 302, an Ethernet destination address 304, an Ethernet source address 306, an Ethernet type 308, a virtual local area network (VLAN) priority 310, a VLAN identifier 312, an Internet protocol (IP) source address 314, an IP destination address 316, an IP protocol 318, a transmission control protocol (TCP)/user datagram protocol (UDP) source port 320, and a TCP/UDP destination port 322. The Ethernet destination address 304 may represent a layer-2 Ethernet hardware address or media access control (MAC) address used in legacy switching and routing. The IP destination address 316 may represent a layer-3 IP address used in legacy switching and routing. Flow switching can be defined for any combination of tuples in the OpenFlow flow switching definition 300, with a particular combination of tuples serving as a key. For example, flows can be defined in a rule 212 of FIG. 2 by exact matching or wildcard matching for aggregated MAC-subnets, IP-subnets, ports, VLAN identifiers, and the like.

Figure 4:
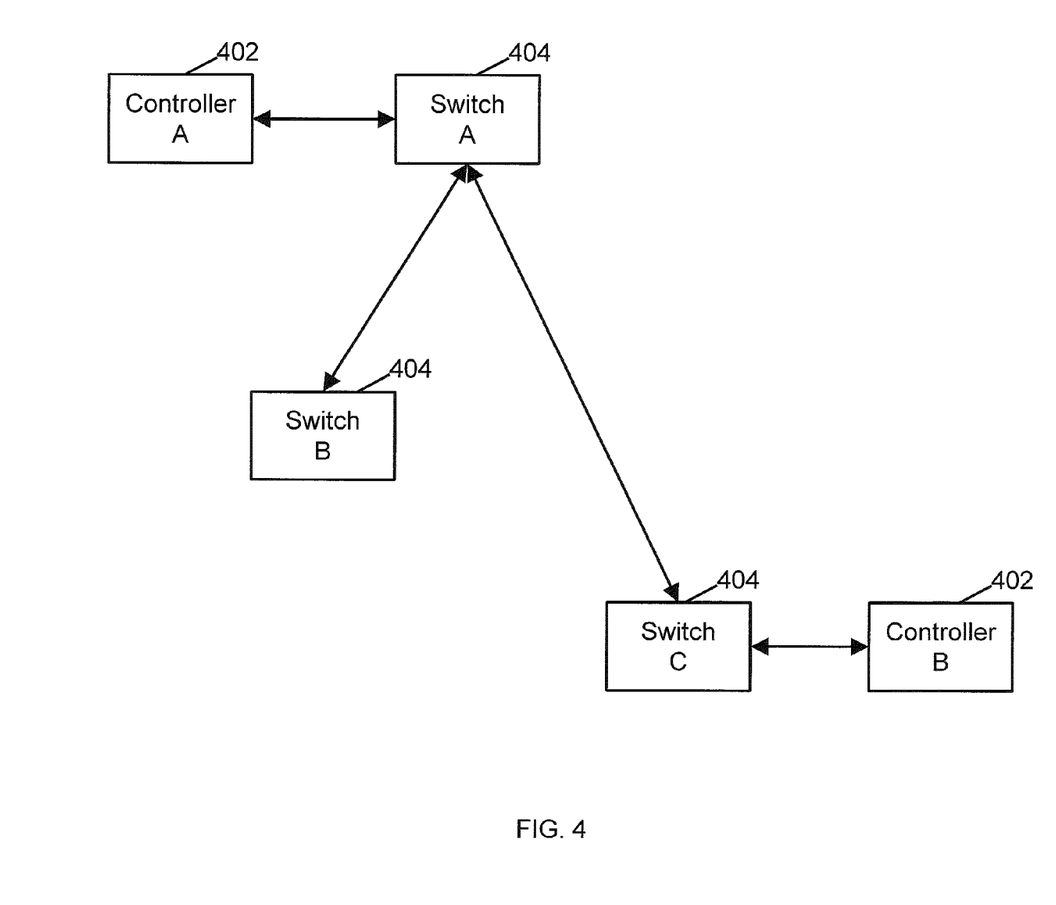
FIG. 4 depicts an exemplary embodiment of a portion of a network including a plurality of network switches and network controllers.

FIG. 4 depicts an exemplary embodiment of a portion of a network including a plurality of switches 404 and controllers 402. In an embodiment, each of the controllers 402 is linked to each of the switches 404 (e.g., via a secure link). In one embodiment, in OpenFlow-capable environments, the controllers 402 are network controllers such as network controllers 112a 112b of FIG. 1. In other embodiments, for non-OpenFlow environments, functions of the controllers 402 can be integrated into other network entities such as server 102 of FIG. 1.

The switches 404 and controllers 402 may support a number of modes of operation including, but not limited to, Ethernet, Fibre Channel, Fibre Channel over Ethernet (FCoE), Internet Wide Area Remote direct memory access Protocol (iWARP), and Remote direct memory access over Converged Ethernet (RoCE).

In an embodiment, one of the controllers 402 (e.g., "Controller A") is designated as the primary controller and the rest of the controllers 402 (e.g., "Controller B") are designated as secondary controllers. The primary controller 402 may include an action table that holds port and protocol information for the switch 404 that it is directly connected to (e.g., "Switch A"), as well as rules, actions, and statistics for flows through the switch 404 and other switches 404 in the network (e.g., "Switch B" and "Switch C"). The primary controller 402 may also include flow control logic that can be implemented in instructions stored in a computer readable storage medium for execution by a processing circuit or in hardware circuitry. The primary controller 402 can manage updates of the flow tables located in the switches 404. Based on the updating of the flow tables, the port and protocol information in the action table of the primary controller 402 is updated to reflect the changes.

As indicated above, the primary controller 402 communicates with the switches 404 via a secure link established using a specified port, such as a port in a physical network controller or a controller implemented in other processors, such as a server 102 or client system 104. The primary controller 404 communicates with the switches 404 to configure and manage the switches 404, to receive events from the switches 404, and to send packets out via the switches 404. Various message types can be sent between the switches 404 and the primary controller 402 to accomplish such functions, including controller-to-switch, asynchronous and symmetric messages.

Controller-to-switch messages are initiated by the primary controller 402 and may or may not require a response back from a switch 404. Features messages are used to request the capabilities of a switch (e.g., upon establishment of the secure link), in response to which a switch 404 should return a features reply that specifies its capabilities. Configuration messages are sent by the primary controller 402 to set and query configuration parameters of a switch 404. The switches 404 may only respond to queries from the primary controller 402. Modify-State messages are sent by the primary controller 402 to manage states on a switch 404, e.g., to add/delete and/or modify flows/groups in the flow table and to set switch port properties. Read-State messages are used by the primary controller 402 to collect statistics from the switches 404. Packet-out messages are used by the primary controller 402 to send packets out of a specified port on a switch 404, and to forward packets received via packet-in messages. Packet-out messages contain a full packet or a buffer identifier (ID) referencing a packet stored in the switch 404. Packet-out messages also contain a list of actions to be applied in the order they are specified; an empty action list drops the packet.

Asynchronous messages are sent without the primary controller 402 soliciting them from the switches 404. The switches 404 may send asynchronous messages to the primary controller 402 to, e.g., denote a packet arrival, switch state change, or error. A packet-in event message may be sent to the primary controller 402 from switches 404 for packets that do not have a matching flow entry, and may be sent from the primary controller 402 to switches 404 for packets forwarded to the primary controller 402. Flow-removed messages are used to indicate that a flow entry has been removed due to, e.g., inactivity or expiration of the flow entry. Port-status messages are sent in response to changes in port configuration state and port status events. Error messages may be used by the switches 404 to notify the primary controller 402 of errors.

Symmetric messages are sent without solicitation, in either direction. Hello messages may be exchanged between the switches 404 and the primary controller 402 upon connection startup. Echo request/reply messages can be sent from either the switches 404 or the primary controller 402, and can be used to measure the latency or bandwidth of a controller-switch connection, as well as verify its liveness. Experimenter messages provide a way for the switches 404 to offer additional functionality within the OpenFlow message type space.

The primary controller 402 includes a link layer reliability or link layer retry (LLR) capability that is provided to maintain data integrity at the link (physical layer) between the primary controller 402 and the switches 404. This feature may be implemented by including in, e.g., the port and protocol information control packet, format information that includes a field for a sequence number assigned to each control packet that is sent to a switch 404. The primary controller 402 may also include LLR logic configured to assign a sequence number to each data packet and may group multiple data packets into a grouping such as a common traffic class. The traffic class may be assigned a priority to be recognized by the switch 404. The primary controller 402 may also be configured to provide LLR response codes or formats. LLR may be implemented in existing hardware structures and link protocols. For example, LLR can be implemented via enhanced transmission selected (ETS) flow control for CEE embodiments.

Figure 5:
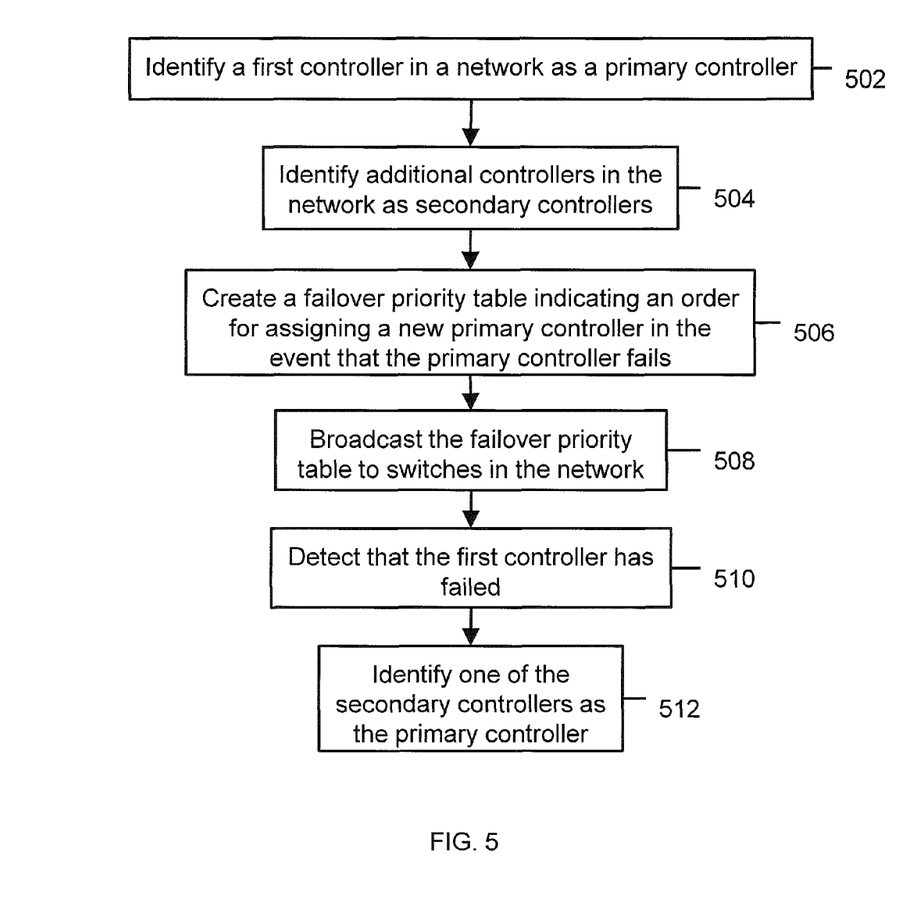
FIG. 5 is a flow diagram of a process for initializing network controllers according to an embodiment.

FIG. 5 is a flow diagram of an embodiment of a process for initializing network controllers through a single layer 2 control network that has a control network switch that is used to manage a plurality of switches in a network. As used herein, the term "control network" refers to the software-defined network controllers and all switches which are attached to these controllers, thus forming a control plane for the switch network. As used herein the term "control network switch" refers to a switch that is directly attached to the primary controller and is used by the primary controller to communicate with the other switches in the network. An example of a control network switch is the switch 404 labeled "Switch A" in FIG. 4 when the controller 402 labeled "Controller A" is the primary controller. Another example of a control network switch is the switch 404 labeled "Switch C" in FIG. 4 when the controller 402 labeled "Controller B" is the primary controller.

Referring to FIG. 5, at block 502, a first controller connected to the network (e.g., a control network) is identified as a primary controller (e.g., the controller 402 labeled "Controller A" in FIG. 4). In an embodiment, the primary controller periodically broadcasts a first frame that identifies it the primary controller to the network. The first frame is received at the control network switch (e.g., the switch 404 labeled "Switch A" in FIG. 4), causing the control network switch to set a flag which establishes the identity of the master controller. At block 504, additional network controllers in the network are identified as secondary controllers (e.g., the controller 402 labeled "Controller B" in FIG. 4). In an embodiment, the secondary controllers periodically broadcast a second frame that identifies them as secondary controllers to the network. Based on receiving the second frame(s), the control network switch may set additional flags which establish the identity of the secondary controllers. A failover priority table that indicates an order for assigning a new primary controller in the event that the primary controller fails is created at block 506. In an embodiment the failover priority table is created by failover priority logic located in a control network switch. The order for assigning a new primary controller from the secondary controllers may be based on variety of factors such as, but not limited to: a latency associated with the secondary controller (e.g., a larger latency may imply that the secondary controller is in a different geographic location than the failing primary controller); traffic at a control network switch associated with the secondary controller; physical features of the secondary controller; and a manual setting of the order by an administrator. In an embodiment, the failover priority table is reordered periodically and/or while the network is operational. At block 508 in FIG. 5, the failover priority table is broadcast to the switches in the network.

Referring to FIG. 5, at block 510, it is detected that the primary controller has failed. In an embodiment, the primary controller fails (i.e., enters a failure mode) when the server hosting the controller has a hardware or software failure, or when the secure communication link between the controller and the network switches fails. At block 512, one of the secondary controllers is chosen to be the new primary controller based on the contents of the failover priority table. The newly identified primary controller assumes control of the network. The primary controller and all secondary controllers should have been provisioned with identical rules for handling packets when the secondary controllers were first added to the network. This can be done by the network administrator who installs the secondary controllers. If the primary controller fails, and a secondary controller is promoted to primary controller, then packets are handled in the same manner as before; if a new type of packet which is not part of the switch match-action-table list arrives, then such packets are forward to the controller to be processed separately or discarded.

In an embodiment, the original primary controller is reestablished as the primary controller once it is no longer in a failing state.

Figure 6:
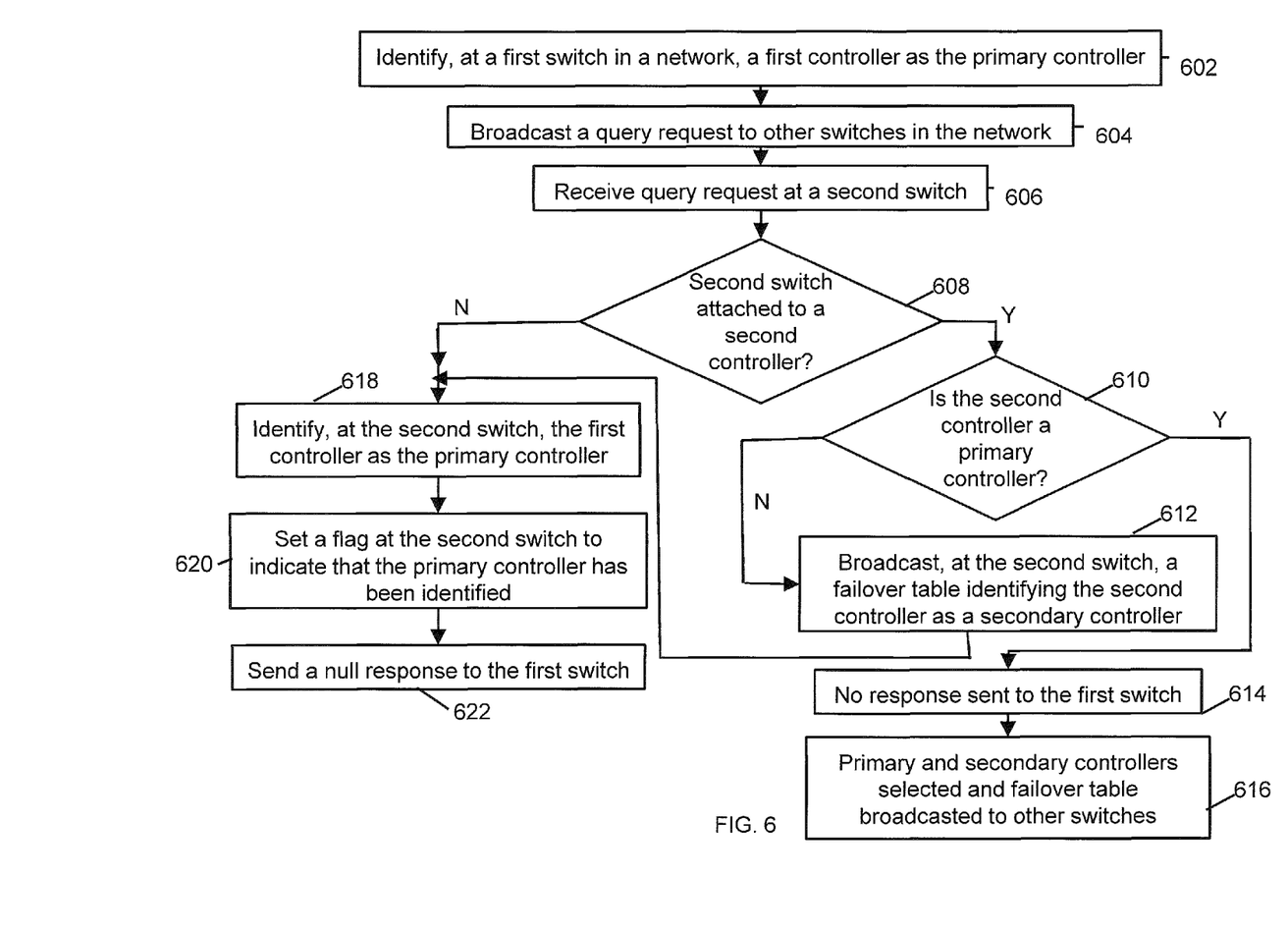
FIG. 6 is a flow diagram of a process for initializing network controllers according to an embodiment.

FIG. 6 is a flow diagram of a process for initializing network controllers according to an embodiment. At block 602, a first controller is identified, by a first switch in a network, as the primary controller. In an embodiment, the controller that is connected to the network first becomes the primary controller. A controller (e.g., the controller labeled "Controller A" in FIG. 4) is attached to one of the switches (e.g., the switch 404 labeled "Switch A" in FIG. 4). The controller and the switch perform a handshake to establish that the switch does not already have a primary controller. If a primary controller already exists in the network (i.e., the switch already has a primary controller), then the controller would become a secondary controller in the network. If a primary controller does not already exist in the network, then the controller becomes the primary controller and the switch becomes the control network switch.

At block 604 in FIG. 6, a query request (a type of controller-to-switch asynchronous message) is broadcast from the control network switch (e.g., the switch 404 labeled "Switch A" in FIG. 4) to all of the other switches in the network (e.g., the switches 404 labeled "Switch B" and "Switch C" in FIG. 4). At block 606, the query request is received at a second switch (e.g., the switch labeled "Switch C" in FIG. 4). At block 608 it is determined whether the second switch is attached to a second controller different from the primary controller. In an embodiment, this determination is made by looking at a flag in the second switch to see if it has been set to indicate that it is attached to a primary controller and the identity of the primary controller (or the control network switch associated with the primary controller). If it is determined, at block 608, that the second switch is not attached to a second controller, then block 618 is performed to identify, at the second switch, the first controller (e.g., the controller labeled "Controller A" in FIG. 4) as the primary controller. At block 620, a flag is set in the second switch to indicate that the primary controller has been identified. At block 622, a null response to the query request is sent back to the first switch to indicate that the second switch has identified the first controller as the primary controller. In an alternate embodiment, no response is sent back to the first switch and processing completes at block 620.

If it is determined, at block 608, that the second switch is attached to a second controller, then at block 610 it is determined whether the second controller is a primary controller to the second switch. If the second controller is not a primary controller to the second switch, then block 612 is performed to broadcast, from the second switch, a failover priority table identifying the second controller as a secondary controller. Processing then continues at block 618 to identify, at the second switch, the first controller as the primary controller.

If it is determined, at block 610, that the second controller is a primary controller to the second switch, then processing continues at block 614 with no response to the query request being sent back to the first switch. At block 616, the primary and secondary controllers are selected from the first and second controllers based on a conflict resolution process. Any conflict resolution process known in the art may be used such as, but not limited to: random selection, and algorithms that take into account controller characteristics. In an embodiment, the first switch knows that the second switch is the only other switch in the network that is attached to a primary controller because the first switch received a null response back from every other switch except for the first switch. In embodiments, where the switches do not send back null response to the first switch to acknowledge the first controller as the primary controller, further processing may take place to determine which switches in the network are potentially deadlocked and require conflict resolution to select a primary controller. Also as part of block 616, the failover priority table as updated by the conflict resolution is broadcasted to switches in the network.

In an embodiment, the control network switch periodically (e.g., based on an elapsed time, based on a specified number of transactions, etc.) performs block 604 to broadcast the query request. This results in the processing described in blocks 606 through block 622 being performed on a periodic basis.

If the other switches in the network fail to respond to the query request within a specified interval of time, then the requesting switch will time out; this switch will raise a timeout notification error to the network controller. The controller will respond according to its error policy defined by the network administrator; it may ignore the timeout, request retransmission of the query message, or simply remove the nonresponsive switch from the network.

Technical effects and benefits include the ability to support redundant controllers in an OpenFlow network, and thus improve the reliability of the OpenFlow network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for network controller initialization, the system comprising:
   a switch in a network, the network including a plurality of switches and a plurality controllers, the plurality of switches including the switch, the system configured to perform a method comprising:
   identifying a controller in the plurality of controllers as a primary controller that manages the switches in the network;
   identifying one or more other controllers in the plurality of controllers as secondary controllers;
   creating a failover priority table that indicates an order that the one or more other controllers will replace the controller as the primary controller in the event that the controller enters a failure mode; and
   broadcasting the failover priority table to the switches in the network.

2. The system of claim 1, wherein the method further comprises:
   detecting that the controller has entered a failure mode; and
   identifying one of the secondary controllers as the primary controller, the identifying based on the failover priority table.

3. The system of claim 2, wherein the method further comprises: detecting that the controller is no longer in the failure mode; and
   reinstating the controller as the primary controller.

4. The system of claim 1, wherein the switches are Open-Flow switches and the controller is an OpenFlow controller.

* * * * *